United States Patent
Tzou et al.

(10) Patent No.: US 7,554,604 B2
(45) Date of Patent: Jun. 30, 2009

(54) METHOD AND APPARATUS FOR SIMULATING THE SCENES OF IMAGE SIGNALS

(75) Inventors: Jyh-Chyang Tzou, Taipei (TW); Chih-Peng Ma, Taipei (TW)

(73) Assignee: Compal Electronics, Inc., Taipei (TW)

( * ) Notice: Subject to any disclaimer, the term of this patent is extended or adjusted under 35 U.S.C. 154(b) by 814 days.

(21) Appl. No.: 11/295,671

(22) Filed: Dec. 7, 2005

(65) Prior Publication Data

US 2007/0035633 A1  Feb. 15, 2007

(30) Foreign Application Priority Data

Aug. 8, 2005  (TW) .............................. 94126708 A

(51) Int. Cl.
*H04N 5/57* (2006.01)
*H04N 9/74* (2006.01)
(52) U.S. Cl. ................. 348/553; 348/801; 348/802; 348/603; 348/121; 348/739; 345/426; 345/46
(58) Field of Classification Search ................. 348/553, 348/227.1, 220.1, 180, 739, 121, 602–604, 348/801–803; 345/46, 428, 426; 463/30, 463/31, 40
See application file for complete search history.

(56) References Cited

U.S. PATENT DOCUMENTS 6,366,283 B1 * 4/2002 Tampieri .................... 345/426

2006/0176303 A1 * 8/2006 Fairclough .................. 345/426

* cited by examiner

*Primary Examiner*—David L Ometz
*Assistant Examiner*—Jean W Désir
(74) *Attorney, Agent, or Firm*—Ming Chow; Sinorica, LLC

(57) ABSTRACT

The present invention relates to a method for simulating the scenes of image signals, which comparing different image signals in alternation time to decide the emitting type and the emitting conversion of a light-emitting device so as to accomplish simulating the scenes of the image signals. The method comprises the steps of: receiving an image signal; sending the image signal to a display device and a light-emitting device respectively; measuring the image signal sent to the light-emitting device and getting a first signal data, the light-emitting device determining its color and brightness according to the first signal data; measuring the image signal sent to the light-emitting device and getting a second signal data after a predetermined time; comparing the first signal data, second signal data with a delay time database to determine whether a delayed light-emitting signal is received; if there is no delay light-emitting signal between the first signal data and second signal data, then the light-emitting device will maintain its color and brightness; and if there exists a delay light-emitting signal between the first signal data and second signal data, then the light-emitting device will light its color and brightness according to the delay light-emitting signal. Furthermore, the present invention also provides a device with the function of simulating the scenes of the image signals and a display device with the function of simulating the scenes of the image signals.

15 Claims, 7 Drawing Sheets

METHOD AND APPARATUS FOR SIMULATING THE SCENES OF IMAGE SIGNALS

BACKGROUND OF THE INVENTION

1. Field of the Invention

The present invention relates to a method and an apparatus for simulating the scenes of image signals, and more particularly to a method and an apparatus for simulating the scenes of image signals that have a light emitting effect of a light emitting device varying according to the scenes of images of a display device to simulate the scenes.

2. Description of the Related Art

The prior art apparatus and method for simulating the scenes of image signals as disclosed in U.S. Pat. No. 6,229,557 provide an ambient light-dependent video-signal processing, and a brightness contrast comparison value is obtained by comparing the measured ambient light for correcting the image signals. The patentee of this patent, Philips Company, has applied this technology to its thin panel television products, so that screen of the thin panel television matches with the interior decoration of the room where the viewer is situated, so as to improve the viewer's feeling of reality. Referring to FIG. 7 for the schematic block diagram of an apparatus for simulating the scenes of image signals according to Philips Company's patent, a brightness contrast comparison value is obtained after a photosensitive resistor (a light-dependent resistor, LDR) 71 receives an ambient light and a sample is taken once for every predetermined time period, and the measured value of the previous brightness contrast is compared. If there is a significant change, a video signal processor 72 is used to correct the brightness and contrast of the image signal; and if there is no significant change, no correction of the image signal is taken, so that the viewer can feel the effect of the simulated scenes. However, such prior art has the following shortcomings: 1. It requires an ambient light receiver 71, and thus the manufacturing cost is increased, and the prior art can be used for high-end models only. 2. It is used for adjusting the brightness and contrast of the images of a television 73 as much as possible, so as to achieve a harmonic effect with the external environment. If the external environment cannot be matched with the images of the television 73, then the function is useless. 3. If there is an error of measuring or computing the ambient light, the quality of the image of the television 73 will be affected significantly.

SUMMARY OF THE INVENTION

The primary objective of the present invention is to provide a method and an apparatus for simulating the scenes of image signals that compare the inputted image signal, so that a light emitting device emits a light similar to the image signal having the highest color and intensity to achieve the purpose of simulating the scenes of image signals.

Another objective of the present invention is to provide a method and an apparatus for simulating the scenes of image signals that do not require an ambient light receiver, but only require sending the signals separately to the display panel and the light emitting unit.

A further objective of the present invention is to provide a method and an apparatus for simulating the scenes of image signals that simulates the scenes of the image signals having the highest color and intensity without being affected by the external environment.

Another further objective of the present invention is to provide a method and an apparatus for simulating the scenes of image signals that can avoid unrecoverable errors. Even if there is an error in the computation of the image signals, the original image signal displayed on the display panel will not be affected.

To achieve the foregoing objectives, an apparatus for simulating the scenes of image signals is connected to a display device and the apparatus for simulating the scenes of image signals comprises: a signal splitter for receiving an image signal and sending the image signal separately to the display device and another end; a chip set coupled to the signal splitter for receiving the image signal sent to the other end and processing the image signal; a memory unit for saving a database; an input/output control circuit coupled to the signal splitter and the chip set; and a light emitting device coupled to the input/output control circuit. After the chip set receives an image signal sent to another end, a first signal data is obtained. After the first signal data is outputted to the input/output control circuit, the first signal data is sent to the light emitting device, and the light emitting device produces a first light emitting status according to the first signal data. After a predetermined time period, the chip set checks the image signal again to obtain a second signal data, and the chip set automatically compares the second signal data with the first signal data. If the difference between the first signal data and the second signal data is larger than a margin, then the second signal data and the first signal data are compared with the database to produce a delay, and the second signal data and the delay are sent to he light emitting device, and the light emitting device produces a second light emitting status according to the second signal data and the delay. If the difference between the first signal data and the second signal data is not larger than the margin, then the light emitting device will remain in the first light emitting status.

To achieve the foregoing objective, a method for simulating the scenes of image signals comprises the steps of: receiving a an image signal; sending the image signal separately to a display device and a light emitting device; measuring the image signal sent to the light emitting device and obtaining a first signal data, and the light emitting device will determine the color and brightness according to the first signal data; measuring the image signal sent to the light emitting device again after a predetermined time period and obtaining a second signal data; comparing the first signal data and the second signal data with a database to determine whether or not a delay light emitting signal is obtained; if there is no delay light emitting signal in the first signal data and the second signal data, then the light emitting device will keep its original light emitting status; and if there is a delay light emitting signal in the first signal data and the second signal data, then the light emitting device will emit light according to the delay light emitting signal.

DETAILED DESCRIPTION OF THE PREFERRED EMBODIMENTS

Figure 1:
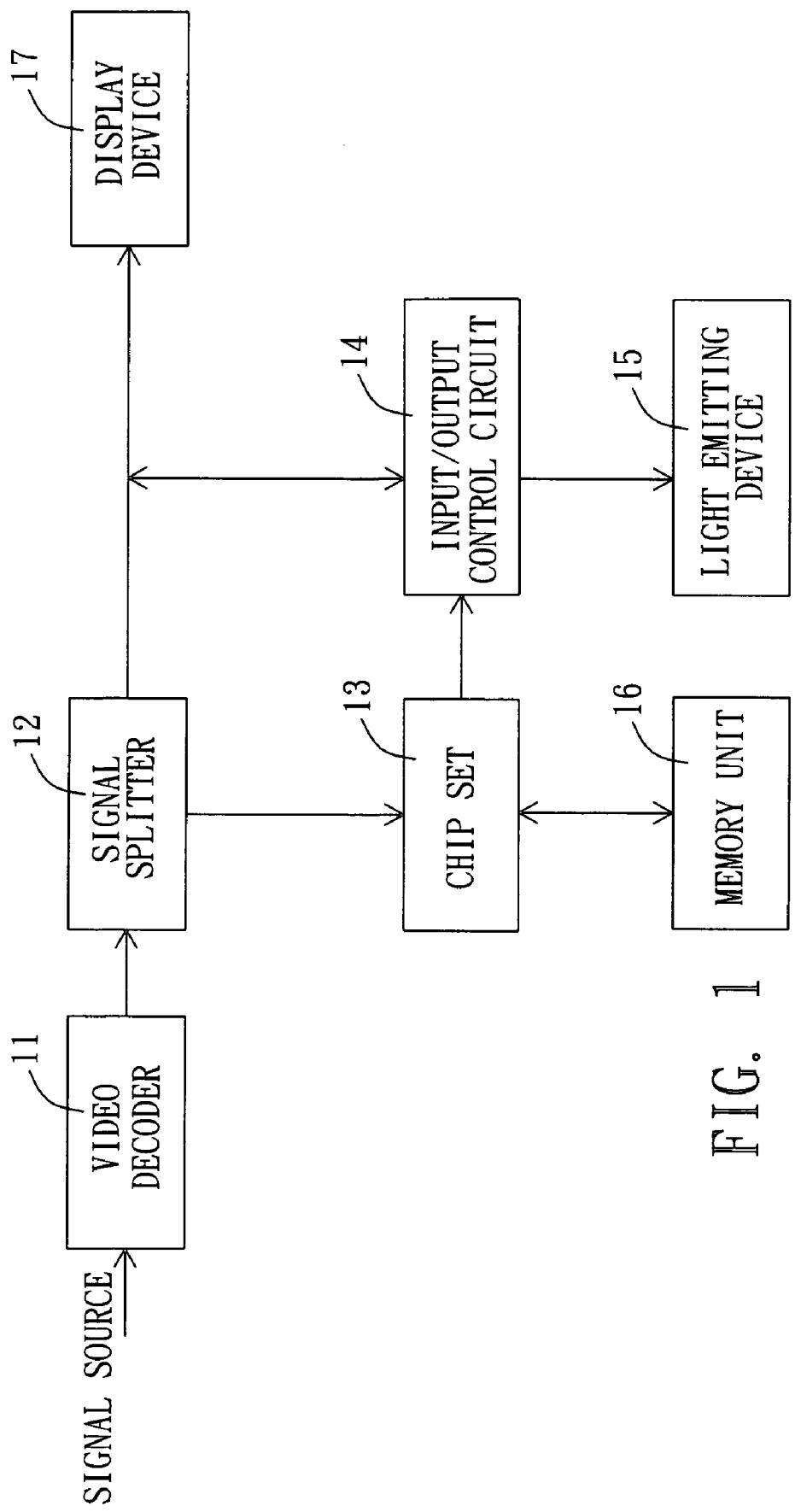
FIG. 1 is a schematic block diagram of an apparatus for simulating the scenes of image signals according to a first preferred embodiment of the present invention.

Referring to FIG. 1 for the schematic block diagram of an apparatus for simulating the scenes of image signals according to a first preferred embodiment of the present invention, the apparatus for simulating the scenes of image signals comprises: a signal splitter 12; a chip set 13; an input/output control circuit 14; a light emitting device 15; and a memory unit 16.

Since the signal source is generally an analog image signal, therefore when the signal source is received, a video decoder 11 decodes the image signal into a digital video signal for its output. The signal source is converted from the original analog image signal to a digital video signal by the video decoder 11, and then the digital video signal is outputted to the signal splitter 12.

The signal splitter 12 is coupled separately to the chip set 13 and a display device 17 at another end. After receiving the digital video signal, the signal splitter 12 splits the digital video signal in two parts and separately outputs to the display device 17 and the chip set 13. One of the split digital video signals is separately displayed by the display device 17 and the other one is processed by the chip set 13.

The input end of the chip set 13 is coupled to the signal splitter 12, and two output ends are coupled separately to an input/output control circuit 14 and a memory unit 16, wherein the memory unit 16 stores a database which is a delay time database (not shown in the figure). The database records the relation of the R, G, B color change and the time delay of different image signals, so that the input/output control circuit 14 can determine the color and brightness of the light emitted by the light emitting device 15 according to the delay light emitting signal.

The input/output control circuit 14 is coupled to the signal splitter 12 and the chip set 13. The input/output control circuit 14 is preferably an LED drive circuit which is controlled by the chip set 13 for driving the light emitting device 15 to emit a light with the color and brightness similar to those of the display device 17.

The light emitting device 15 is coupled to the input/output control circuit 14 and is preferably an LED (Light-emitting diode, LED) or an OLED (Organic light-emitting diode, OLED). For LED, it is preferably a high-brightness color LED.

The display device 17 is coupled to the signal splitter 12 and preferably a flat display device such as a liquid display device, a plasma device, or an OLED device. Of course, the display device 17 has a lower base, and the light emitting device 15 of the invention can be installed at the lower base of the display device 17, so that the light emitted by the light emitting device 15 can be exposed from the periphery of the lower base.

Figure 2:
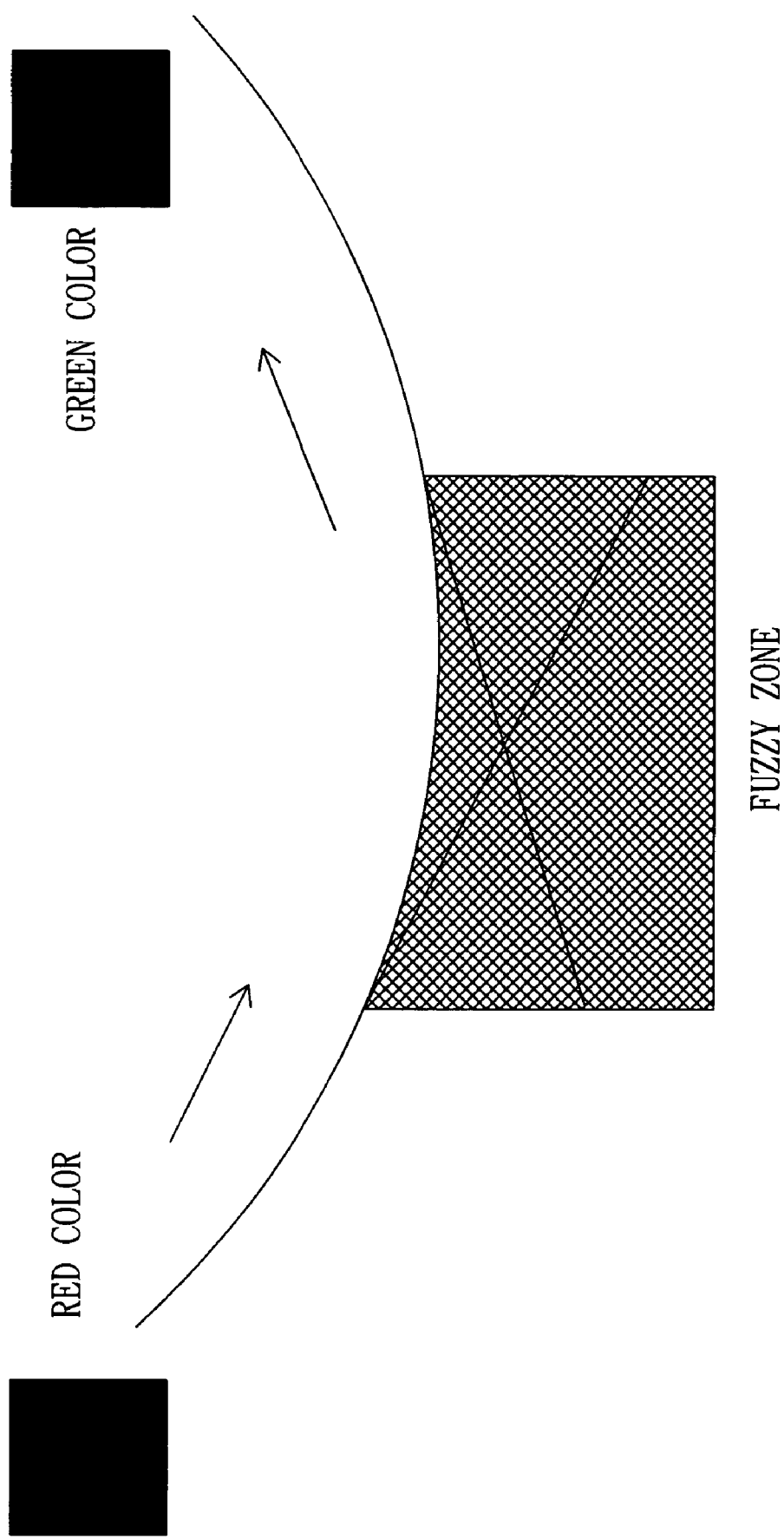
FIG. 2 is a schematic view of the delay and the light emitting change of an apparatus for simulating the scenes of image signals of the present invention.

Referring to FIG. 2 for the schematic view of the delay and the light emitting change of an apparatus for simulating the scenes of image signals of the present invention, the apparatus for simulating the scenes of image signal must be able to prevent the light emitted from the light emitting device 15 from being continuously changed according to the change of color and brightness of the display device 17. Therefore, it is necessary to design a mechanism to control the light emitting delay and the light emitting change (color and brightness) of the light emitting device 15. The mechanism is a database stored in the memory unit 16. When the color of the display device 17 is changed from a red series to a green series, the light emitting delay and can be selected from the database in order to convert the light emitting smoothly from a red series to a green series. So the color of light emitted by the light emitting device 15 has a transitional light emitting status that changes the color gradually from the red color series to the green color series during the delay. In such transitional light emitting status, the red color series will be decreased gradually and become dark. The color will slowly become green and the brightness will be increased gradually, and finally the light emitting change is completed. Therefore, the viewer will not find the constant change of colors of the light emitting device 15 offending, so as to achieve the purpose of simulating the scenes according to the present invention.

To make it easier for our examiner to understand the present invention, the preferred embodiment as shown in FIG. 2 is used for illustration. When the apparatus for simulating the scenes of image signals is operated, a first signal data (red color) is obtained after the chip set 13 receives the image signal, and the red color has the R, G, B values of 80%, 10%, and 10% respectively. After the first signal data is outputted to the input/output control circuit 14, the first signal data is sent to the light emitting device 15, and the light emitting device 15 emits a light (such as red color) having the color and brightness similar to those of the external display device 17 according to the first signal data. After a predetermine time (such as 2 or 3 seconds), the chip set 13 checks the image signal again to obtain a second signal data (such as green color), and the green color here the R, G, B values of 15%, 70%, and 15% respectively. Now, the chip set 13 automatically compares the differences of R, G, B values of the second signal data (such as green color) with the first signal data (such as red color), which are |Rdif|=65%, |Gdif|=60%, and |Bdif|=5%. In this preferred embodiment, assumed that the predetermined margins of the R, G, B values are Rmar=15%, Gmar=15% and Bmar=15% respectively. The margin is a means of when the light emitting device 15 must change the emitting status. So the margin can be adjusted according to the user's feeling about the color change. Since everyone has their different feeling about the color change, users can make the adjustment according to their own needs. In this preferred embodiment, |Rdif|=65% is larger than Rmar=15% and |Gdif|=60% is larger than Gmar=15%, so the chip set 13 compares the second signal data and the first signal data with the database to generate a delay (such as one second). The second signal data (such as green color) and the delay (such as one second) are sent to the light emitting device 15, and the light emitting device 15 produces a second light emitting status according to the second signal data (such as green color) and the delay (such as one second) as shown in FIG. 2. The light emitting device 15 smoothly changes the red color series to a dark color from the first light emitting status (red color) within the delay, and then slowly becomes green and the brightness becomes brighter, and then the color is converted into a second light emitting status (green color) so as to complete the light emitting change. If the difference between the first signal data and the second signal measured by the data chip set 13 is not larger than a predetermined margin, then the light emitting device 15 will keep the first light emitting status. In other words, the original light emitting status remains unchanged.

In this preferred embodiment, the chip set 13 separately computes the average R, G, B values of the first signal data and the second signal data, and separately records the average R, G, B values. The average R, G, B values of the second signal data are compared with the average R, G, B values of the first signal data. If the difference of the average R, G, B values of the second signal data is larger than the margin, then a corresponding delay is searched in the database, and the delay light emitting signal is produced for the light emitting device 15. If two differences of the average R, G, B values of the second signal data are larger than the margin, then a corresponding delay is searched in the database, and the maximum delay is obtained and a delay light emitting signal is produced for the light emitting device 15 according to the maximum delay.

Similarly, the chip set 13 checks the image signal again after a predetermined time to obtain a third signal data, and the third signal data is compared with the second signal data according to the foregoing method to determine the color and brightness of the light emitted from the light emitting device 15. Two successive signal data are checked and compared once for every predetermined time period, and thus the light emitting device 15 can emit a light with the color and brightness similar to the screen played on the display device 17. The effect of simulating the scenes can be achieved regardless of the game mode or the movie mode. Of course, the predetermined time period can be changed to achieve different effects.

Compared with the prior art, the apparatus for simulating the scenes of image signals of the present invention includes the following advantages: 1. The light emitting device 15 emits the light similar to that of the image signal having the maximum color and intensity, so as to achieve the effect of simulating the scene of the image signal. 2. It does not require an ambient light receiver, but the signals are sent separately to the display device 17 and the light emitting device 15, which can save costs. 3. The scene of the image signal having the maximum color and intensity can be simulated without being affected by the external environment. 4.Even if there is an error on computing the image signal, the original image displayed by the display device 17 will not be affected, and thus unrecoverable error can be avoided. Therefore, the present invention definitely can overcome the shortcomings of the prior art apparatus for simulating the scenes of image signals.

Figure 3:
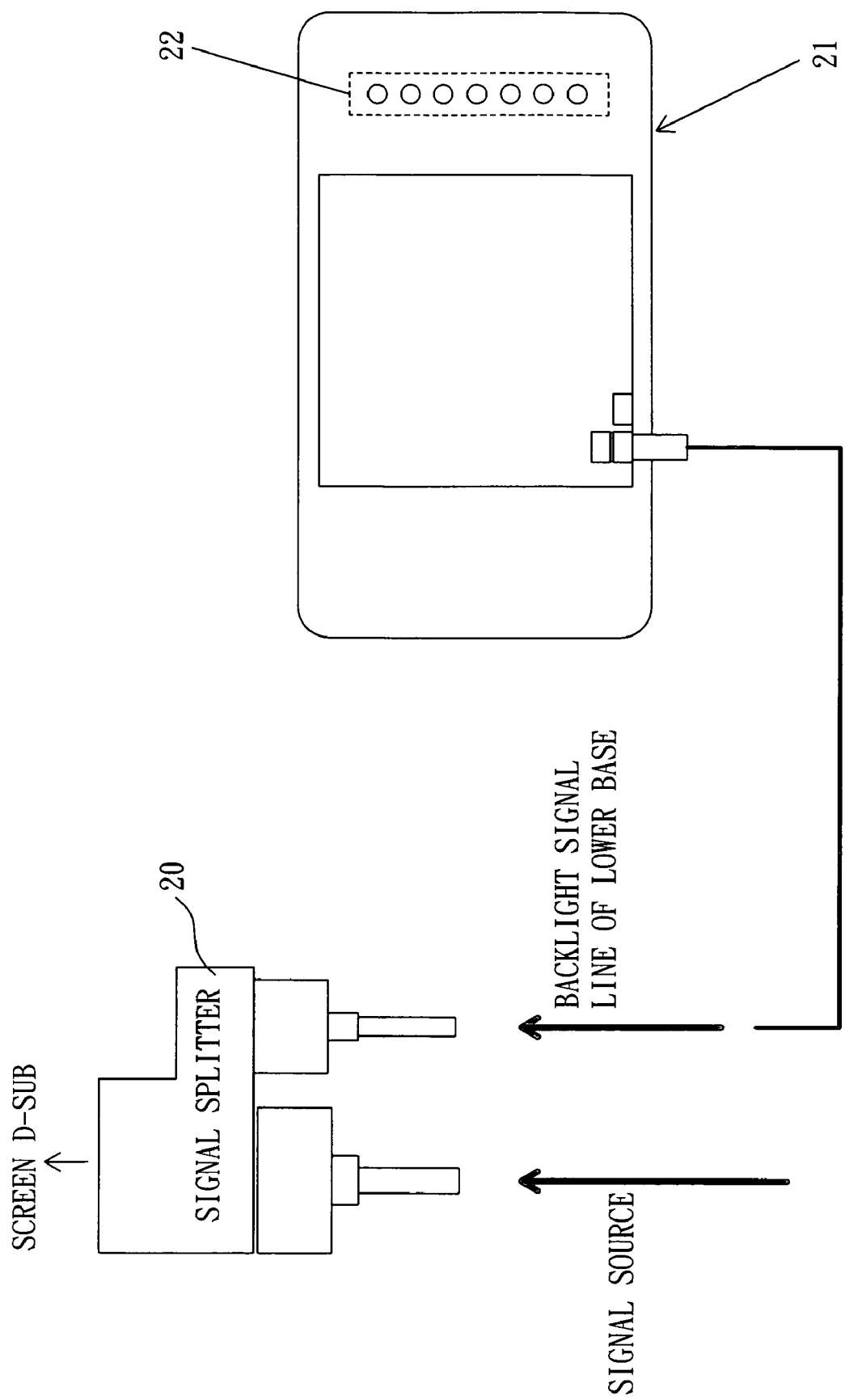
FIG. 3 is a schematic view of a signal splitter of an apparatus for simulating the scenes of image signals according to a first preferred embodiment of the present invention.

Referring to FIG. 3 for the schematic view of a signal splitter of an apparatus for simulating the scenes of image signals according to a first preferred embodiment of the present invention, the signal splitter 12 sends the image signal split by a signal splitter 20 to the light emitting body 22 and the screen (not shown in the figure) at the lower base 21, and the light emitting body 22 emits similar lights, so as to achieve the purpose of simulating the scene of the image displayed by the display device.

Figure 4:
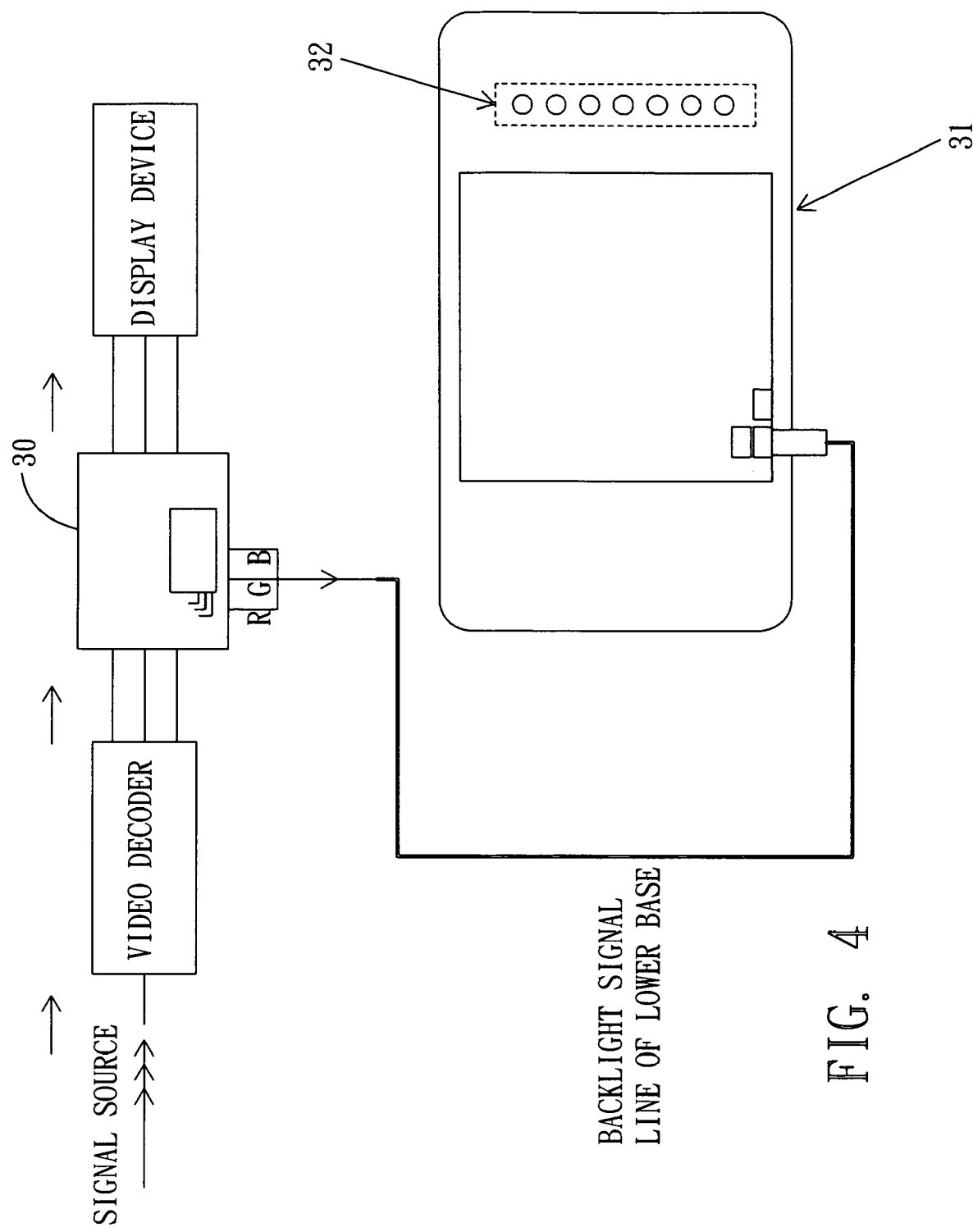
FIG. 4 is a schematic view of a signal splitter of an apparatus for simulating the scenes of image signals according to a second preferred embodiment of the present invention.

Referring to FIG. 4 for the schematic view of a signal splitter of an apparatus for simulating the scenes of image signals according to a second preferred embodiment of the present invention, the signal splitter of the present invention can be build directly into a signal split circuit of an electronic substrate 30 of an LCD screen. After the image signal source is split by the signal split circuit of the electronic substrate 30, the image signals are sent separately to the light emitting body 32 and the display device (panel) on the lower base 31. The light emitting body 32 emits similar lights, so as to achieve the purpose of simulating the scene of the image displayed by the display device.

Figure 5:
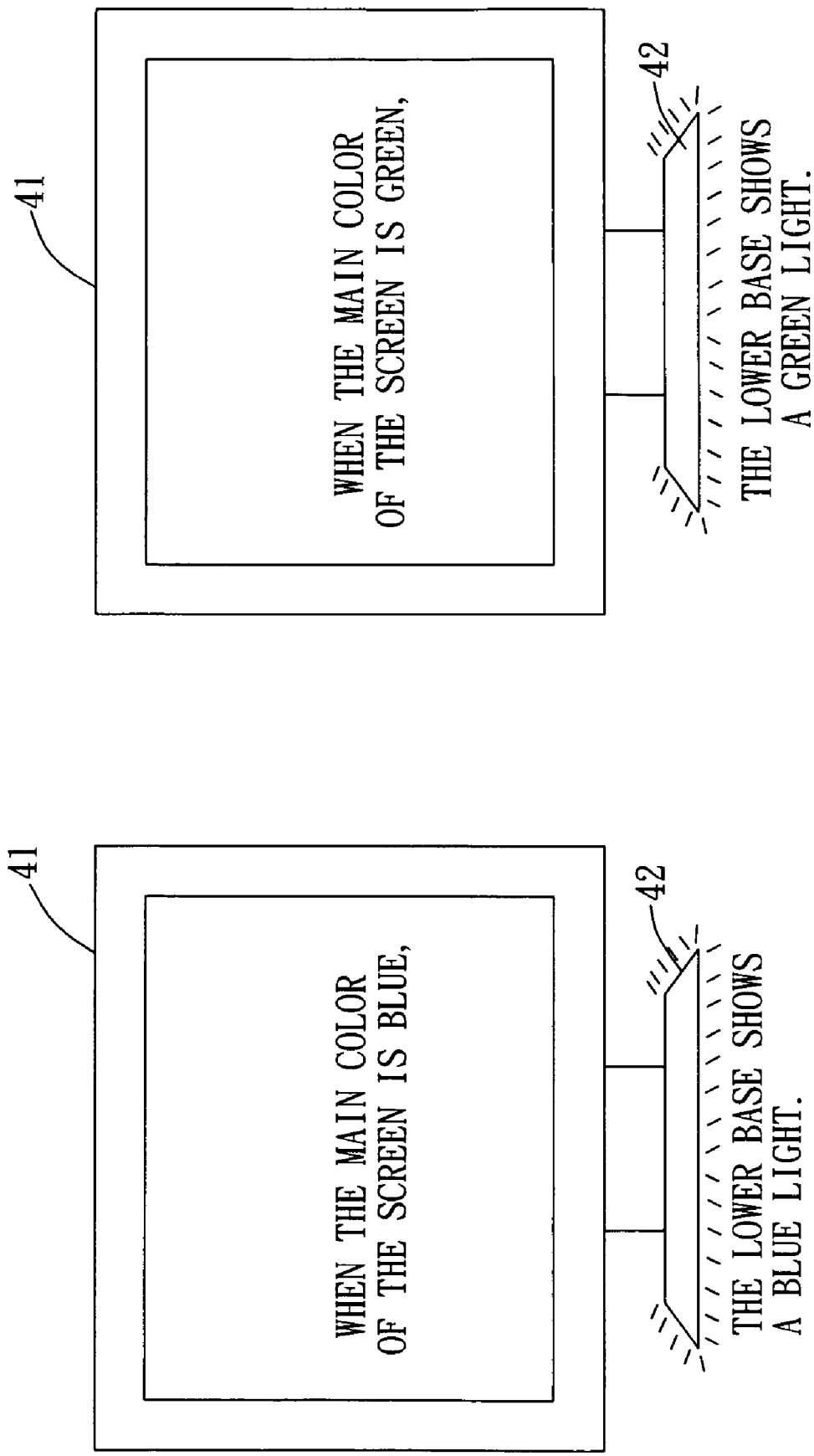
FIG. 5 is a perspective view of a display device of an apparatus for simulating the scenes of image signals according to a first preferred embodiment of the present invention.

Referring to FIG. 5 for the perspective view of a display device of an apparatus for simulating the scenes of image signals according to a first preferred embodiment of the present invention, the display device of the present invention comprises a display panel 41 and a lower base 42, wherein the light emitting device is installed in the lower base 42 and exposed from the lower base 42. During an operation, if the display panel 41 shows a blue color, the light emitting device on the lower base 42 also shows a blue color exposed from the periphery of the lower base 42. If the blue color displayed by the display panel 41 is converted into a green color, the light emitting device at the lower base 42 also changes the color gradually from blue to green. Therefore, the change of colors is synchronized regardless of the game mode or the movie mode.

Figure 6:
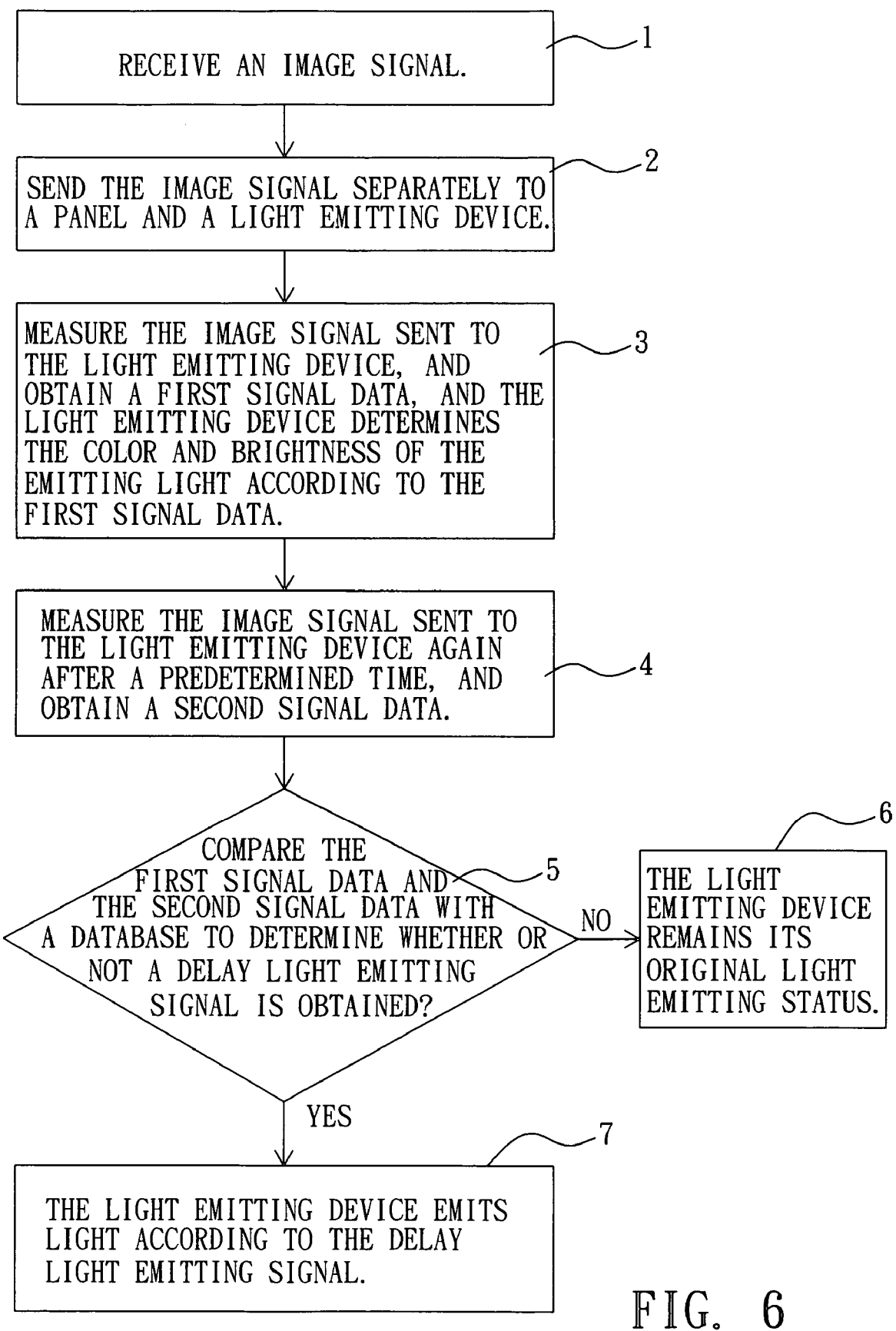
FIG. 6 is a flow chart of a method for simulating the scenes of image according to the present invention.
Figure 7:
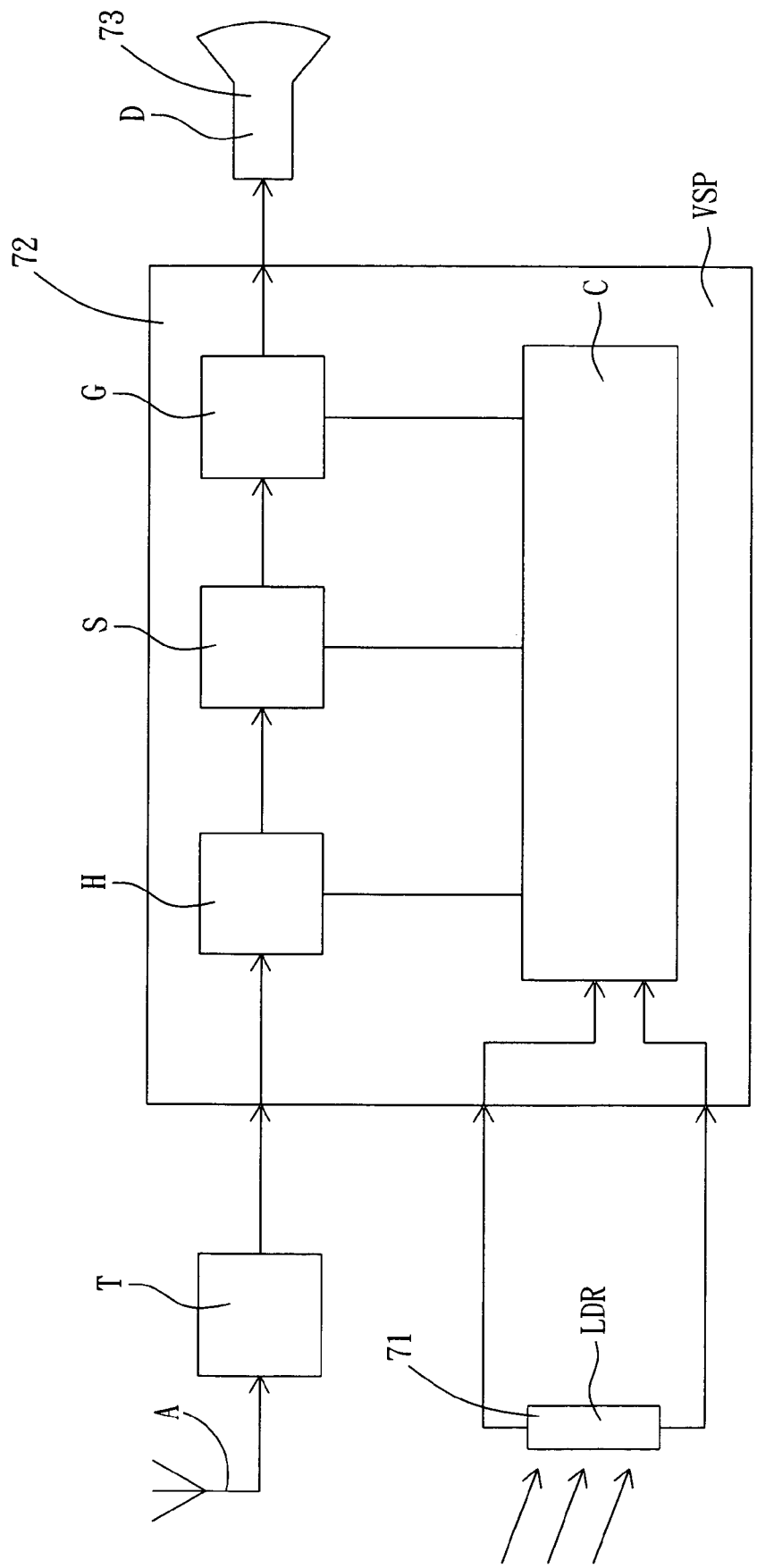
FIG. 7 is a schematic block diagram of an apparatus for simulating the scenes of image according to a Philips patent.

Referring to FIG. 6 for the flow chart of a method for simulating the scenes of image according to the present invention, the method comprises the steps of: (Step 1) receiving an image signal; (Step 2) sending the image signal separately to a display device and a light emitting device; (Step 3) measuring the image signal sent to the light emitting device and obtaining a first signal data, and the light emitting device determines the color and brightness of the emitting light according to the first signal data; (Step 4) measuring the image signal sent to the light emitting device again after a predetermined time and obtaining a second signal data; (Step 5) comparing the first signal data and the second signal data with a database to determine whether or not a delay light emitting signal is obtained; (Step 6) If there is no delay light emitting signal in the first signal data and the second signal data, then the light emitting device remains its original light emitting status; and (Step 7) If there is a delay light emitting signal in the first signal data and the second signal data, then the light emitting device emits light according to the delay light emitting signal.

In Step 1, the image signal is a digital video signal. In general, the received signal is usually an analog signal, and thus a video decoder is provided for decoding the received signal into a digital video signal for the output.

In Step 2, the display device is a flat display device such as a liquid crystal display device, a plasma display, or an OLED device. Of course, the display device could be an external display device or a display device integrated with the light emitting device. The light emitting device is preferably an LED or an OLED. For LED, it is preferably a high-brightness color LED.

In Step 3, a chip set measures the image signal sent to the light emitting device and obtains a first signal data. The light emitting device will determine the color and brightness of the emitted light according to the first signal data.

In Step 4, the chip set measures the image signal sent to the light emitting device again after a predetermined time period and obtains a second signal data. The predetermined time period could be a fixed time period such as checking the image signal once every 2 seconds or a random time period such as checking the image signal once every 2 second or 3 seconds, etc.

In Step 5, the chip set compares the first signal data and the second signal data with a database to determine whether or not a delay light emitting signal is obtained. The database is stored in the chip set or the memory, and the chip set analyzes the relation of the color change and the time delay to generate the delay light emitting signal. The delay light emitting signal includes the relation of the color change and the time delay as shown in the fuzzy zone of the color change of FIG. 2. The light emitting device will determine the color and brightness of the emitted light according to the delay light emitting signal, and the light emitting device changes the emitted light in a smooth manner, so that the viewer feels the light source similar to the screen displayed by the display device, so as to achieve the effect of simulating the scenes.

In Step 6, if the chip set determines that there is no delay light emitting signal in the first signal data and the second signal data, then the light emitting device will remain in its original light emitting status.

In Step 7, if the chip set determines that there is a delay light emitting signal in the first signal data and the second signal data, then the light emitting device will emit light according to the delay light emitting signal. Since the database records the relation between the color change and the time delay, therefore after the chip set compares the first signal data and the second signal data with the database and obtains a delay light emitting signal, the color, brightness, and smooth change of the light emitted from the light emitting device are determined according to the delay light emitting signal.

In view of the description above, the method and apparatus for simulating the scenes of image signals include the following advantages: 1. The light emitting device 15 emits the light similar to that of the image signal having the maximum color and intensity, so as to achieve the effect of simulating the scene of the image signal. 2. It does not require an ambient light receiver, but the signals are sent separately to the display device 17 and the light emitting device 15, which can save costs. 3. The scene of the image signal having the maximum color and intensity can be simulated without being affected by the external environment. 4. Even if there is an error on computing the image signal, the original image displayed by the display device 17 will not be affected, and thus unrecoverable error can be avoided.

With the present invention, the light emitting effect of the light emitting device can be adjusted according to the change of scenes and images of the display device, so as to achieve the effect of simulating the scenes. Therefore, the present invention definitely can overcome the shortcomings of the prior art method and apparatus for simulating the scenes of image signals.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. An apparatus for simulating the scenes of image signals, being coupled to a display device, and said apparatus for simulating the scenes of image signals comprising:
    a signal splitter, for receiving an image signal and sending said image signal separately to said display device and another end;
    a chip set, coupled to said signal splitter for receiving and processing said image signal sent to said another end;
    a memory unit, coupled to said chip set for storing a database;
    an input/output control circuit, coupled to said signal splitter and said chip set; and
    a light emitting device, coupled to said input/output control circuit;
    such that a first signal data is obtained after said chip set receives said image signal sent to said other end, and said first signal data is outputted to said input/output control circuit and then sent to said light emitting device, and said light emitting device produces a first light emitting status according to said first signal data, and said chip set checks said image signal after a predetermined time to obtain a second signal data, and said chip set automatically compares said second signal data and said first signal data; if the difference between said first signal data and said second signal data is larger than a margin, then said second signal data and said first signal data are compared with said database to produce a delay, and said second signal data and said delay are sent to said light emitting device, and said light emitting device produces a second light emitting status according to said second signal data and said delay; and if the different between said first signal data and said second signal data is not larger than said margin, then said light emitting device remains in said first light emitting status.

2. The apparatus for simulating the scenes of image signals of claim 1, wherein said input/output control circuit is an LED drive circuit, said light emitting device is an LED which is preferably a high-brightness color LED.

3. The apparatus for simulating the scenes of image signals of claim 1, wherein said chip set separately computes the average of R, G, B values of said first signal data and said second signal data and separately records said average of R, G, B values, and the average of R, G, B values of second signal data is compared with the average of R, G, B values of said first signal data; if the average of R, G, B values of said second signal data includes a difference larger than a margin, then a corresponding delay in said database is searched to produce said delay light emitting signal to said light emitting device; if the average of R, G, B values of said second signal data includes two or more differences larger than said margin, then the corresponding delays in said database are searched, and the maximum value of said delays is used to produce said delay light emitting signal to said light emitting device.

4. The apparatus for simulating the scenes of image signals of claim 1, wherein said display device is a flat display device and has a lower base.

5. The apparatus for simulating the scenes of image signals of claim 4, wherein said flat display device is a liquid crystal display device, a plasma display device or an OLED device.

6. The apparatus for simulating the scenes of image signals of claim 1, wherein said database records the relation between a change of R, G, B colors and a delay to produce said delay light emitting signal, so that said input/output control circuit determines the color and brightness of said light emitting device according to said delay light emitting signal.

7. The apparatus for simulating the scenes of image signals of claim 1, wherein said light emitting device is preferably disposed in a lower base of said display device, and the emitting light is exposed from the periphery of said lower base.

8. The apparatus for simulating the scenes of image signals of claim 1, wherein said image signal is a digital video signal.

9. The apparatus for simulating the scenes of image signals of claim 1, wherein said delay is one second.

10. A method for simulating the scenes of image signals, comprising the steps of:
    receiving an image signal;
    sending said image signal separately to a display device and a light emitting device;
    using a chip set to measure said image signal sent to said light emitting device to obtain a first signal data, and said light emitting device determines the color and brightness of an emitted light according to said first signal data;

measuring said image signal sent to said light emitting device again after a predetermined time by said chip set to obtain a second signal data;

comparing said first signal data and said second signal data with a database by said chip set to determine whether or not a delay light emitting signal is obtained;

if said first signal data and said second signal data do not have said delay light emitting signal, then said light emitting device will keep its original light emitting status; and if said first signal data and said second signal data have said delay light emitting signal, then said light emitting device will emit lights according to said delay light emitting signal.

11. The method for simulating the scenes of image signals of claim 10, wherein said image signal is a digital video signal.

12. The method for simulating the scenes of image signals of claim 10, wherein said display device is a flat display device.

13. The method for simulating the scenes of image signals of claim 12, wherein said flat display device is a liquid crystal display device, a plasma device, or an OLED device.

14. The method for simulating the scenes of image signals of claim 10, wherein said light emitting device is an LED which is preferably a high-brightness color LED.

15. The method for simulating the scenes of image signals of claim 10, wherein said database records the relation between a color change and a time delay to produce said delay light emitting signal for determining the color, brightness and smooth change of said light emitting device.

* * * * *